A. B. JENNINGS.
TOOL CHEST.
APPLICATION FILED APR. 3, 1917.
1,268,124.
Patented June 4, 1918.
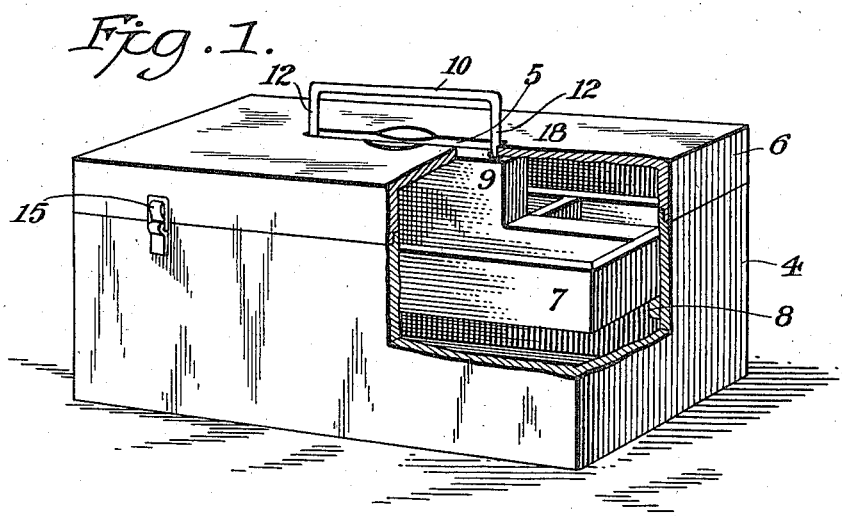
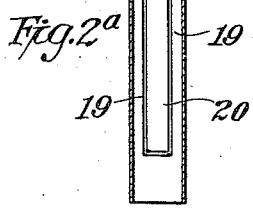 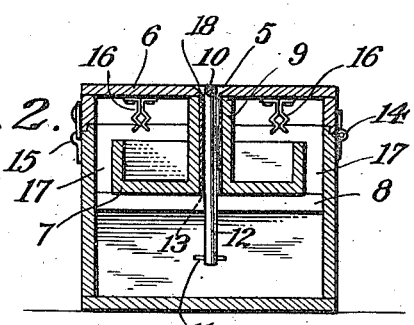 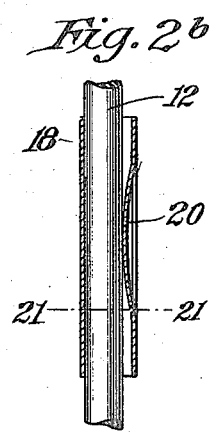
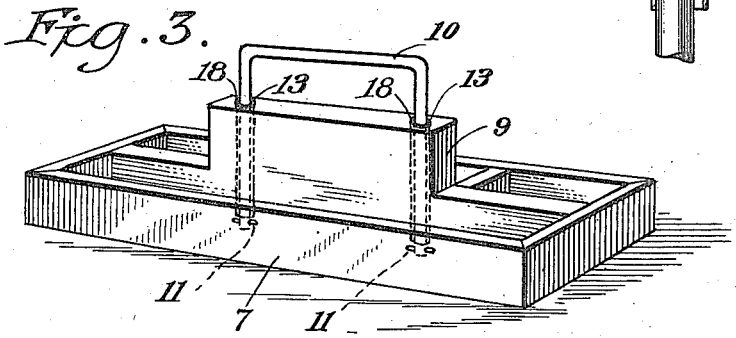
Inventor
Archer B. Jennings
By his Attorney
Alfred Shedlock.

UNITED STATES PATENT OFFICE.

ARCHER B. JENNINGS, OF MERIDEN, CONNECTICUT.

TOOL-CHEST.

1,268,124.     Specification of Letters Patent.     Patented June 4, 1918.

Application filed April 3, 1917. Serial No. 159,418.

*To all whom it may concern:*

Be it known that I, ARCHER B. JENNINGS, a citizen of the United States, residing at Meriden, county of New Haven, State of Connecticut, have invented new and useful Improvements in Tool-Chests, of which the following is a specification.

The tool container forming the subject of this invention comprises a chest having an opening through the lid and a tray adapted to be inclosed in the chest and removable therefrom.

The object of the invention is to provide a depressible handle adapted, when in extended position, to afford a ready carrying means for the chest with the tray inclosed therein and for carrying the tray alone when removed from the chest. The handle in depressed position seats in and is protected by the slot opening in the lid of the chest, then being below the surface of the top of the chest so as to in no way interfere with close packing and transportation of the chests. To meet the requirements of this invention the handle is movably attached to the tray, it preferably having a vertically sliding movement thereon. For convenience of holding special tools, &c., the tray may be divided into compartments, the longitudinal central partition of which extends upwardly to the inside surface of the chest lid. The handle carrying bar is provided with legs or branches which pass through suitable vertical holes in the partition of the tray with sufficient freedom to permit of vertical movement relative to the tray and with sufficient friction to cause the handle to be held in its up and down set positions. The lower ends of the branches of the handle are provided with stops to limit the upward movement of the handle and prevent its separation from the tray.

These features with means for insuring freedom of action of and holding the handle in set positions will now be fully set forth in the description of the accompanying drawings, in which:

Figure 1, is a perspective view of a tool container embodying my invention, partly in section to show the arrangement of the tray in the chest with the handle in raised or active position.

Fig. 2, a transverse sectional view of the tool container complete, showing the handle in depressed or inactive position.

Fig. 3, a perspective view of the tray, detached, with the handle in carrying position.

Fig. 2ª, a vertical section of one of the ferrule bearings for the branches of the handle, and:

Fig. 2ᵇ, a similar view taken at right angles to Fig. 2ª, showing a branch of the handle therein.

The chest 4, shown, is of usual rectangular form but has a slot opening 5, formed through the lid 6. The tray 7, is held in the upper part of the chest by resting on the ledges or ribs 8, on the insides of the ends of the chest. As shown in Fig. 2, the tray is of less width than the inside of the chest, affording room for large tools, as saws, &c., between the sides of the tray and the chest. The tray may be divided into compartments by suitable partitions, the longitudinal central one 9, of which has its central part extended upwardly, so that when the tray is resting on the ledges 8, the inside of the lid will contact with or be close to said partition.

The carrying means for the tray 7, alone and for the assembled chest and tray consists of a handle, preferably and economically made of wire, comprising a bar 10, and right angularly arranged branches or legs 12, 12. These branches are spaced apart to pass through holes 13, formed vertically through the partition 9, of the tray 7; they may so fit in the holes with sufficient friction to hold the handle in the upper active position and yet allow the handle to be moved easily either from its upper or depressed position to the other position. It is preferred however to provide the holes with metal bushings, as ferrules, as hereafter described. The lower ends of the branches 12, are provided with stops, as nuts, or pins 11, as shown in the drawings. Any suitable device may be used for this purpose that will support the chest, tray and tools.

The tubular metal linings or ferrules 18 for the holes 13, may consist of short pieces of pipe or be made from sheet metal formed into tubes of sufficient size for free play of the branches 12, of the handle therein, and slitted as at 19, for the formation of spring tongues 20, as shown at Fig. 2ª, which will press against the branches 12, with sufficient friction to hold the handle in all set positions. The slits 19, may extend to one end of the ferrules. Assuming that the ferrules terminated at the line 21, Fig. 2, then said line will indicate the ends of the ferrules and also the ends of the slits, showing the slits extending upwardly from the ends of the ferrules.

The chest 8, and lid 6, are secured together by hinges 14, in the usual manner, and the lid is firmly held in closed condition by ordinary chest clasps 15, or other suitable devices.

16, designates clasps for holding tools, &c., on the inside of the chest lid, and 17, designates the spaces for large tools between the chest and the tray, longitudinally thereof.

I claim:

1. A tool container, comprising a chest provided with ledges on its inside walls and a hinged lid having a central opening, a tray adapted to seat on the ledges and against the upper part of which the lid, when closed, bears, a handle frictionally held in the central part of and adapted to slide in the tray, so as to lie wholly within the upper surface of the lid when in depressed position and, when raised, to extend above the lid to afford a carrying means for the chest with the tray inclosed therein and for the tray alone when removed from the chest.

2. In a tool container, in combination, a chest, a detachable tray adapted to be supported in the upper part of the chest and provided with a central partition against which the lid of the chest, when closed, bears, ferrules fitted in vertical holes in the partition, a handle having branches arranged to slide in said ferrules, an opening through the top of the chest into which the handle may be depressed and through and above which the handle projects when in raised active position.

3. In a tool container, in combination, a chest, a detachable tray adapted to be supported in the upper part of the chest and provided with a central partition against which the lid of the chest, when closed, bears, vertical holes formed through the partition, metal ferrules seated in said holes and provided with spring acting tongues, an opening through the lid of the chest, a handle comprising a gripping bar, adapted to lie in and pass through the lid opening, and having downwardly extending branches spaced apart to pass through the ferrules in the partition of the tray and stops at the lower ends of said branches.

4. In a tool container, in combination, a chest, a detachable tray of less width than the inside of the chest, adapted to be supported in the upper part of the chest and provided with a central partition against which the lid of the chest, when closed, bears, an opening through the lid of the chest, vertical holes formed through the partition, a handle comprising a gripping bar, adapted to lie in and pass through the lid opening, and downwardly extending branches spaced apart to pass through the holes with frictional sliding contact and stops at the lower ends of the handle branches.

Signed at Meriden, county of New Haven, State of Connecticut, this second day of March, 1917.

ARCHER B. JENNINGS.

In the presence of—
LEROY P. SMITH,
FRANK H. McGAR.